United States Patent [19]

Tomka

[11] Patent Number: 5,362,777
[45] Date of Patent: Nov. 8, 1994

[54] THERMOPLASTICALLY PROCESSABLE STARCH AND A METHOD OF MAKING IT

[76] Inventor: Ivan Tomka, Schutzenmattstr. 1, 5600 Lenzburg, Switzerland

[21] Appl. No.: 115,243

[22] Filed: Aug. 30, 1993

Related U.S. Application Data

[63] Continuation of Ser. No. 785,931, Oct. 31, 1991, abandoned, which is a continuation-in-part of Ser. No. 536,683, Jul. 11, 1990, abandoned.

[30] Foreign Application Priority Data

Nov. 3, 1988 [CH] Switzerland .................. 4083/88

[51] Int. Cl.$^5$ .................. C08L 3/04; C08L 89/06; C08L 101/00; C09H 9/02
[52] U.S. Cl. .................. 524/47; 524/52; 536/102; 536/111; 106/210; 106/163.1; 106/813; 127/71
[58] Field of Search ............ 536/102, 111; 106/210, 106/163.1, 813; 427/2, 3; 524/47, 52

[56] References Cited

U.S. PATENT DOCUMENTS 4,330,443  5/1982  Rankin .................. 527/312

FOREIGN PATENT DOCUMENTS 0327505  9/1989  European Pat. Off.
1014801  12/1965  United Kingdom.

*Primary Examiner*—Nathan M. Nutter
*Attorney, Agent, or Firm*—Ostrolenk, Faber, Gerb & Soffen

[57] ABSTRACT

In order to produce thermoplastically processable starch, an additive or plasticizer respectively is mixed with native or natural starch and the mixture is caused to melt by the application of heat and mechanical energy. The additive is a substance which lowers the melting point of the starch so that the melting point of the starch together with this additive lies below the decomposition temperature of the starch and the additive furthermore has a solubility parameter of over 15 cal$^{\frac{1}{2}}$cm$^{-3/2}$. After the mixture of starch and additive is molten, the melt is mixed until it is at least almost homogeneous. The vapor pressure of the additive within the melting range of the mixture of starch and additive should be less than one bar. Preferably the mixing process is executed without the presence of water.

27 Claims, No Drawings

THERMOPLASTICALLY PROCESSABLE STARCH AND A METHOD OF MAKING IT

BACKGROUND OF THE INVENTION

This is a continuation of application Ser. No. 07/785,931 filed on Oct. 31, 1991, now abandoned which was a continuation-in-part of application Ser. No. 07/536,683 filed Jul. 11, 1990 and now abandoned.

The present invention refers to thermoplastically processable starch, a method of producing thermoplastically processable starch, a method of producing granulates, flakes, etc., and shaped bodies, extrudates, sheets, etc., of starch, and to shaped bodies, fillers and carrier materials consisting essentially of starch.

Natural or so-called native starch, such as obtained by washing and drying from raw starch, particularly potatoes, grain, corn, etc., has a pronounced macromolecular structure with the macromolecules penetrating only in part, if at all, into each other. This structure causes the native starch to be very heterogeneous, and the heterogeneity is normally maintained, at least in part, upon the melting of the starch.

In the course of the increased use of so-called hydrophilic polymers, which also include starch, as so-called natural plastics for the most diversified fields of use, attempts have been made to process the starch by means of the known plastic processing techniques, i.e., for example, by means of injection molding and extrusion. As a result of the above-described properties of native starch, it was however not possible to produce shaped bodies of starch which have sufficient mechanical properties, such as, for example, strength. In accordance with the processing techniques known today for the processing of so-called hydrophilic polymers such as gelatins or cellulose, attempts have been made to homogenize starch having a water content on the order of magnitude of 10 to 20%, based on the total weight, in, for instance, a screw extruder of an injection molding machine, and then process it. It has been found that this processing technique results in an improvement in the mechanical properties of the shaped starch bodies and thus in the homogenization effect in the molten starch if the water in the intake zone of the screw piston is not expelled from the starch as steam but rather remains in the starch along the entire length of the piston. It is also a prerequisite here that excellent mixing take place, as is the case, for instance, in a kneader or a twin-shaft extruder having a correspondingly long piston length. The shaft piston or kneader piston in this case forms a quasi-closed space, the length of the piston and the control of the temperature along the piston being critical in order for the homogenization effect to be sufficiently produced.

This procedure for the production of homogenous starch, or rather thermoplastically processable starch, is obviously complicated and critical since various processing parameters, such as the maintaining of a sufficient water content, temperature, process control, type of machine, length of screw, etc., must be precisely maintained. It is therefore not surprising that it is recommended in known methods to separate the so-called homogenizing step, also known as a destructuring step, from the following processing of the molten starch in order to obtain satisfactory properties of the shaped starch body. It is essential in accordance with said process that the first process step be carried out in a closed system so that the water cannot escape in, for instance, the form of steam.

The high water content necessary in said method is, as is generally known in plastic processing technique, not necessarily advantageous for the processing or for the properties of the shaped bodies to be produced. In particular, for example, a water content on the order of 17% or more prevents reasonable extrusion of the starch, particularly for the production of sheets, profiled sections or tubes. It may be said in general that an open processing method, such as is present for instance upon extrusion, is made impossible as a result of the high vapor pressure of water, which is definitely above one bar.

GB Patent 1 014 801 describes a method in accordance with which a cooled mixture of native starch containing 12% to 15% water, or a not substantially smaller content of water, and a gelatinization promoter is processed to form a plastic-like product. In accordance with the method described, it is essential that the starch have a sufficient water content.

Federal Republic of Germany OS 3 712 029 describes a method for the pressure molding of molded bodies of starch in which a mixture of native starch with, inter alia, 0.5% of a lubricant and 10% to 22% water is melted in an injection molding machine within a temperature range of 90° C. to 240° C. and then processed. It is essential here that the water content be retained during the entire process.

It is therefore an object of the present invention to provide thermoplastically processable starch and a method of making it which does not have the disadvantages mentioned above in order to permit a simpler process and to make possible an unproblematic thermoplastic processing of the starch in accordance with the known polymer processing techniques.

In accordance with the invention, this object is achieved. There is provided a thermoplastically processable starch consisting essentially of an at least approximately homogeneous mixture of starch and/or a starch derivative with at least 10% of at least one additive or plasticizer respectively, the additive having a solubility parameter of more than 15 (cal$^{\frac{1}{2}}$cm$^{-3/2}$) and, on mixing with the starch, reducing the melting point thereof in such a manner that the melting point of the starch together with the additive lies below the decomposition temperature of the starch. The value of the solubility parameter is caused substantially by polar interactions between the molecules of the composition.

Thermoplastically processable starch (TPS) is a homogeneous amorphous mass which at storage conditions crystallizes only insignificantly. TPS is made out of native starch by swelling in a solvent (plasticizer) and followed by a heated kneading process (thermomechanical transformation). Thereby the mechanical deformation work (MA) is incorporated into the starch mass. The exotherm energy is expressed as integral solution enthalpy (HI) in kJ per mol of the ground molar unity of the starch (anhydro-glycose unity) and the incorporated mechanical deformation work in kWh per kilogram of the kneaded mass.

Suitable solvents or plasticizers (additives) have a solubility parameter $>15$ kg$^{\frac{1}{2}}$cm$^{-3/2}$, whereby the intermolecular interaction energies $\leq 20\%$ are based on dispersion forces and $\geq 80$ on polar interaction forces between the molecules. A typical example for a solvent is 1,2,3-tri-hydroxypropane (THP). By using THP the values are MA$=0.32$ kWh/kg and HI$=6.6$ kJ/mol at a transformation temperature of 165° C. The structural conversions at the build-up of TPS are the following:

Loss of the native conformation of the starch at the glycosidic O-bindings, as the widening of the helix structure (dihedral angle) at the glycosidic oxygen atom decreases from $>|\pm 20°|$ to $<|\pm 20°|$;

Loss of the double refraction birefringence of the starch;

Complete loss of the wide angle X-ray defraction above 2° scattering angle at the reflexes which are detectable at the starch in its native state.

TPS has structure viscous behavior in shear flow above 165° C. and shows above $10^{-2}S^{-1}$ shear velocity with no plateau region of the structure viscosity. TPS has gas barrier properties similar to polyvinylidene chloride.

There is also provided a thermoplastically processable starch which consists essentially of an homogeneous mixture of starch and/or a starch derivative with at least one additive or plasticizer respectively, the additive or additives having a vapor pressure of less than one bar within a temperature range close to the melting point of the homogeneous mixture in which the starch is thermoplastically processed.

It is furthermore preferred that the average molar weight of the starch used be at least one million and preferably within a range of three million to ten million. This can be controlled by the measurement of the intrinsic viscosity.

The thermoplastically processable starch can be in the form of granulates, flakes, pills, tablets or powder, or in the form of fibers.

There is furthermore provided a method of preparing thermoplastically processable starch in which essentially native or natural starch together with at least one additive or plasticizer is caused to melt by the introduction of heat, whereupon the mixture of starch and additive or plasticizer is mixed at least until the melt is at least approximately homogeneous. The additive or plasticizer is a substance which, when mixed with starch, reduces the melting point thereof so that the melting point of the starch together with this additive is below the decomposition temperature of the starch and furthermore the additive has a solubility parameter of more than 15 (cal$^{\frac{1}{2}}$cm$^{-3/2}$).

The solubility parameter of the additive or plasticizer within the temperature range of 150° to 300° C. is preferably on the order of magnitude of 15 to 25 cal$^{\frac{1}{2}}$cm$^{-3/2}$. The method is preferably performed under anhydrous conditions and therefore water is preferably removed from the reagents before or upon mixing.

The solubility parameter δ as is known consists essentially of three parts, namely a polar part $\delta_P$, a part $\delta_H$ corresponding to the hydrogen bonds, and a dispersion part $\delta_d$ and is a function of these three variables. In accordance with the invention, it is proposed that the polar part $\delta_P$ and the part $\delta_H$ corresponding to the hydrogen bonds of the solubility parameter δ are both larger than the dispersion part $\delta_d$ of the solubility parameter δ of said at least one additive. $\delta_P$ and $\delta_H$ are preferably each at least twice as large as the dispersion part $\delta_d$.

In particular, if the melting and mixing of the starch with the at least one additive or plasticizer respectively takes place in an open environment, i.e. not under pressure, then the vapor pressure of the additive within the melting range of additive plus starch at which the mixing or processing of the thermoplastically processable starch takes place must be less than one atmosphere in order that the additive does not escape or escapes in uncontrolled manner from the mixture with the starch.

It is furthermore preferred that said at least one additive or plasticizer respectively be so selected that the interfacial surface energy between additive and starch is not greater than 20% of the individual interfacial surface energies with respect to air. If the plasticizer satisfies this requirement, assurance is then had that the interaction between plasticizer and starch will be sufficient.

The amount of plasticizer based on the total weight of the mixture is preferably 5 to 35%.

It is preferred that the mixing of the molten starch with the additive be effected within a temperature range of 150° to 300° C., and preferably 160° to 190° C.

Mixing of the natural or native starch together with the additive or plasticizer respectively can be effected by introducing the mixture into a plastic processing machine such as, for instance, a single shaft or twin-shaft extruder or a kneader and mixing the mixture so as to form an at least approximately homogeneous thermoplastic mass. Particularly when the vapor pressure of the additive within the temperature range of the mixing is less than one atmosphere, the mixing can be effected in any open or closed vessel. Only when the vapor pressure of the additive within the temperature range of the mixing is greater than one atmosphere need the vessel be closed so that the additive does not escape from the mixture.

The additive or plasticizer respectively can be at least one of the following substances: dimethyl sulfoxide (DMSO), sorbitol, glycerine, ethylene glycol, propylene glycol, diglyceride, diglycol ether, succinic acid anhydride, formamide, N,N-dimethylformamide, N-methylformamide, dimethylacetamide, N-methylacetamide N,N'-dimethylurea, and/or alcohol-amines such as e.g. ethanol amine or propanol amine.

The preferred plasticizer indicated by way of example above have substantially a solubility parameter δ which is either approximately equal to 15 cal$^{\frac{1}{2}}$cm$^{-3/2}$ or else, as required, greater than this value. Thus, for instance, the solubility parameter of ethylene glycol is 16.3 cal$^{\frac{1}{2}}$cm$^{-3/2}$, formamide 17.8, glycerine 21.1, and N-methylformamide 16.1, diglyceride 15.8, etc.

For the determination of the solubility parameter, reference may be had furthermore to the following literature: J. Brandup, E. H. Immergut, *Polymer Handbook*, Second Edition, 1975, John Wiley, pages IV-337 et seq., in particular Table 3. In said book, Table 3.3 individually lists both the solubility parameter δ as well as the portions $\delta_P$, $\delta_H$ and $\delta_d$.

However, there is also suitable as additive at least one substance in accordance with the following equation:

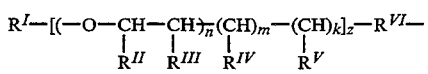

in which k, m and n are each 0 to 5, $R^I$ is H or alkyl, each of $R^{II}$ to $R^{VI}$ is individually OH or NH$_2$ provided at least one is OH, and n=0 when m, k≠0, and z is a positive integer (1, 2 ... + ∞) or

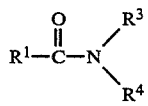

in which R[1] is H, alkyl or —NR[3]R[4], and R[3] and R[4] individually H or alkyl provided in case that R' = —NR[3]R[4] they are not all H or alkyl simultaneously. Alkyl groups preferably have 1-4 carbon atoms.

It is further provided to add to the mixture of starch and additive at least one further addition substance such as, for instance, a blending component, a filler, a lubricant, a softener, a flexibilizer, a pigmenting agent or some other coloring substance and/or a mold-removal agent.

The following materials, in particular, are suitable as blending components: gelatin, protein, polysaccharide, cellulose derivative, synthetic polymer which is at least almost soluble in an additive for the starch, and/or gelatin phthalate. There can be 0 to 50 wt. % and preferably 3 to 10 wt. % filler, based on the total weight of the mixture of starch and additive.

It is furthermore possible to add at least one inorganic filler, such as, for instance, magnesium oxide, magnesium carbonate, alumina, silicon dioxide, titanium dioxide, calcium oxide, calcium carbonate, etc., in a concentration of 0.02 to 3 wt. %, and preferably 0.02 to 1 wt. %, based on the total weight.

As softeners there are suitable, in particular, polyalkylene oxides, glycerin mono- and diacetate, sorbitol, as well as a citrate, which is added to the mixture of starch and additive in a concentration within the range of 0.5 to 15 wt. % and preferably 0.5 to 5 wt. %.

For the coloring of the mixture of starch and additive there are suitable, in particular, organic or inorganic pigments in a concentration on the order of magnitude of 0.001 to 10 wt. % and preferably 0.05 to 3 wt. %.

In order to improve the flow properties there are used, in particular, animal or vegetable fats and or lecithins which are preferably used in hydrogenated form, these fats and other fatty acid derivatives preferably having a melting point of more than 50° C.

In order to reduce the hydrophilic nature and thus the water instability of the thermoplastically processable starch during and after its processing, it is furthermore possible to add to the mixture of starch and additive a cross-linking agent or an agent for chemically modifying the starch, such as, for instance, polyolefins or alkylsiloxanes.

The following substances are particularly suited as cross-linking agents: divalent and polyvalent carboxylic acids as well as their anhydrides, acid halides and/or acid amides of bivalent and polyvalent carboxylic acids, derivatives of bivalent and polyvalent inorganic acids, epoxides, formaldehyde and/or urea derivatives, divinyl sulfones, isocyanates, oxo compounds such as acetone formaldehyde or polyvalent oxo compounds and or cyanamide. When using acid amides of carboxylic acids, one acid group should be present as free carboxyl group.

The methods of producing thermoplastically processable starch described above are suitable, in particular, for the production of granulates, flakes, pills, powders, tablets, fibers, etc., of thermoplastically processable starch.

The thermoplastically processable starch prepared in accordance with the methods described above can be processed further directly in accordance with the ordinary known plastic processing methods. To be sure, particularly upon the extrusion of tubes, sheets and the like, one must see to it that the additive has a vapor pressure at the processing temperature which is less than one atmosphere in order to prevent foaming of the starch. With too high a water content it is impossible, for instance, to produce blown sheets, tubes, etc. By the addition of a sufficient amount of additive, the natural absorption of water in the starch is at least partially prevented.

The thermoplastically processable starch prepared in accordance with the methods described above is suitable, in particular, as a blending component or formulating aid for addition to thermoplastic or thermosetting polymers. The suitability as blending component or formulating aid is a result, in particular, of the fact that the properties of the thermoplastically processable starch can be controlled by the molar weight or molar-weight distribution of the starch, which is relatively narrow. Furthermore, the thermoplastically processable starch is suitable, for instance, as carrier material for active substances such as, for instance, pharmaceutical active substances, and reagents such as flocculating agents for waste water.

Thermoplastically processable starch is also suitable for binding water in a low-water environment and/or on a water-pervious substrate. The starch is extruded, for instance, in the form of large surface foils or networks and placed on the substrate of for instance sand or gravel. Due to its hydrophilic nature, the starch binds water so that watering of the earth can be effected more efficiently, for instance, in desert-like territories.

The method of the invention will now be explained further on basis of a few basic test results with reference to tables. In this connection:

Table I shows the effect of additives on the melting point of native starch;

Table II shows the homogenization process with different amounts of additive and different homogenization conditions, as well as the effects thereof on the molar weight and crystallinity of the starch;

Table III shows selected mechanical values of homogenized and insufficiently homogenized starch, and Table IV shows the dependence of the shear viscosity on the homogenization temperature and the composition of the starch.

In order to investigate the influence of additives on the native starch, it is necessary to remove the water content of about 17%, which is naturally present in the starch. This is done by the customary methods of drying. Depending on the properties desired for the shaped body to be produced, such as thermal and mechanical properties in particular, about 10 to 35% plasticizer or additive respectively is preferably added to the native starch, the water of the starch being replaced by the addition of the additives or removed by drying. The melting point of the starch can also be substantially influenced thereby, which has an effect, on the one hand, on the processing of the starch and, on the other hand, on the dimensional stability under heat of the shaped bodies produced.

This influence was studied further by adding five preferred plasticizers. First of all the native starch was completely dried so as to exclude the influence of water. Thereupon 25 wt. % of plasticizer substance was admixed in each case with the dried starch and the mixture slowly heated, the feeding of the heat being precisely observed. In this way, the thermal conversion of the mixture could be accurately followed and a conclusion reached as to the temperature range in which the mixture is completely melted. As plasticizers, DMSO, glycerin, ethylene glycol, propylene glycol and sorbitol were used. The thermal conversion regions were measured and thus the influence of the plasticizers on the melting point of the starch are set forth in Table I.

Of the additives used, DMSO reduces the melting point of the starch most, while the use of propylene glycol gives a relatively high melting region of about 200° C. There was also examined an addition of propylene carbonate, in which case the starch decomposes before melting. The reduction of the melting point evidently is related to the influencing the molecular structure in the native starch, but this effect was not further examined for the time being.

starch and additive. The homogeneity of the melt was tested by producing test pieces and subjecting them to stress/strain tests. In the region where the mechanical properties measured (tensile strength or tear strength) could not be substantially further improved, it could accordingly be concluded that the melt had sufficient homogeneity. Based on this stress/strain test, sufficient reference data can be obtained in order to conclude, with a given composition of the melt of starch and additive, the suitable dwell time in the extruder or kneader.

Table II shows the homogenizing of starch carried out under different homogenization conditions and the effects thereof on the homogeneity of the resultant thermoplastically processable starch. Used were the potato starch $P_3$ together with 25% plasticizer having a melting range of about 180° C. and potato starch $P_4$ together with 25% additive having a melting range of about 190° C.

TABLE II

| a Starch | b Sample | A | $T_3$ (°C.) | $T_4$ (°C.) | $T_5$ (°C.) | $T_6$ (°C.) | $T_E$ (°C.) | B (RPM) | C (kW) | D (Kg/hr.) | E (g/Mol) | F (%) |
|---|---|---|---|---|---|---|---|---|---|---|---|---|
| $P_3$ | 2a | 0.4 | 180 | 170 | 160 | 160 | 155 | 150 | 16 | 81 | 193 | 50 |
| $P_3$ | 2b | 0.4 | 160 | 150 | 150 | 160 | 158 | 150 | 18 | 90 | 165 | 40 |
| $P_3$ | 3a | 0.35 | 180 | 160 | 155 | 159 | 160 | 150 | 18 | 99 | 173 | 40 |
| $P_3$ | 3b | 0.35 | 180 | 160 | 155 | 155 | 156 | 150 | 14 | 90 | 188 | 50 |
| $P_3$ | 3c | 0.35 | 180 | 160 | 150 | 188 | 175 | 150 | 20 | 90 | 145 | 30 |
| $P_3$ | 4a | 0.3 | 180 | 170 | 160 | 188 | 199 | 150 | 35 | 90 | 130 | 0 |
| $P_3$ | 4b | 0.3 | 190 | 190 | 190 | 198 | 196 | 150 | 35 | 90 | 116 | 0 |
| $P_3$ | 5a | 0.25 | 180 | 180 | 180 | 190 | 195 | 150 | 22 | 90 | 66 | 5 |
| $P_3$ | 5b | 0.25 | 190 | 185 | 186 | 205 | 200 | 150 | 33 | 90 | 69 | 0 |
| $P_4$ | 6 | 0.4 | 155 | 160 | 170 | 160 | 160 | 150 | 17 | 90 | 239 | 40 |
| $P_4$ | 7 | 0.35 | 155 | 150 | 150 | 170 | 180 | 150 | 25 | 90 | 153 | 15 |
| $P_4$ | 8 | 0.3 | 190 | 190 | 180 | 200 | 195 | 150 | 36.5 | 90 | 126 | 0 |
| $P_4$ | 9 | 0.35 | 170 | 190 | 160 | 180 | 180 | 150 | 20 | 90 | 73 | 25 |
| $P_4$ | 10 | 0.35 | 170 | 180 | 180 | 190 | 190 | 150 | 30 | 90 | 68 | 5 |
| $P_4$ | 11a | 0.3 | 165 | 170 | 170 | 190 | 190 | 150 | 30 | 75 | 141 | 5 |
| $P_4$ | 12a | 0.25 | 185 | 185 | 185 | 200 | 200 | 130 | 40 | 75 | 92 | 0 |
| $P_4$ | 12b | 0.25 | 185 | 160 | 160 | 190 | 190 | 130 | 35 | 75 | 95 | 5 |
| $P_3$ | 13 | 0.25 | 185 | 185 | 190 | 260 | 200 | 130 | 40 | 55 | 91 | 0 |
| $P_3$ | 14 | 0.3 | 185 | 185 | 190 | 200 | 205 | 120 | 38 | 55 | 141 | 0 |

TABLE I

| | Thermal Conversion (Temp °C.) | | |
|---|---|---|---|
| Additive | from | Peak Center | to |
| propylene glycol | 150 | 170 | 190 |
| ethylene glycol | 140 | 160 | 180 |
| glycerin | 145 | 165 | 170 |
| DMSO | 65 | 80 | 150 |
| Sorbitol | 160 | 180 | 190 |

25 wt. % plasticizer
0 wt. % water

If the mixture of starch and plasticizer is processed further, then attention must be paid to the resultant melting point upon the homogenization process, i.e. upon the mixing of the melt of starch and plasticizer. Thus, for instance, mixtures of propylene glycol and native starch with amounts of propylene glycol in the range of 10 to 25% were fed to a kneader and then mixed at 175° C. Depending on the amount of additive, the dwell time of the mixture in the kneader was 40 to 100 seconds, in which connection the processing temperature could be decreased by admixing more additive so as to achieve sufficient homogeneity in the melt. In another example, glycerin was added and the processing temperature was correspondingly lowered in the kneader.

The average power in the kneader in the above-mentioned test was about 30–40 kW per 100 kg of mixture of Column A indicates the composition of the starch/additive mixture, the value A being grams of additive per (grams of starch+grams of additive). A=0.15 therefore means 15 grams of additive in 100 grams of mixture of starch+additive. Used was a mixture of the aforementioned preferred plasticizers, the mixture having a solubility parameter of 20 cal$^{\frac{1}{2}}$cm$^{-2/3}$ at 150° C.

The temperatures $T_3$ to $T_6$ represent desired temperature values of the controlled temperatures of the individual zones of the homogenization device. The homogenization device used was a kneader.

TE is the temperature of the mass upon emerqence from the kneader.

B is the speed of rotation of the kneader shaft in rpm.

C is the power introduced into the mass in the form of mechanical work in kW.

D is the mass flow in the kneader, i.e. the rate of flow of the melt through the kneader in kg/hr.

E is the intrinsic viscosity of the thermoplastic starch after leaving the kneader, measured in solution in 0.1 N KOH at 60° C. after a dissolving time of one hour at 110° C. in an Ubelhode capillary viscosimeter, measured in cm$^3$ per gram. E is thus a measure of the molar weight (M) of the thermoplastic starch (in gram/mol). The corresponding correlation is $E = 0.2 \times M_G^{0.4}$ ($M_G$=weight average of the molecular weight). E of the native untreated starch is 260, so that a value of $M_G$ of the native untreated starch $6 \times 10^7$ results.

F is the crystalline portion in percent. By means of the crystallinity of the starch it can be determined whether the homogenization has been effected sufficiently and the starch is thus thermoplastically processable. Native starch is highly crystalline, while thermoplastically processable starch has practically no crystalline content.

Measurement of the Crystalline Content:

Method of measurement: X-ray diffraction on powder

Measurement value: Intensity of the scattered dispersion as a function of the scatter angle Native potato starch: sharp reflexes at the dispersion angles (degrees) 6, 14, 17, 20, 22, 24, 26.

Measure of the crystallinity:

Fx=surface content of the scatter intensity/scattering angle function for the sharp reflexes of the treated starch, Fn=surface content as above for the native untreated starch $$F = \frac{F_x}{F_n} \cdot 100(\%)$$

The F values of the treated starch in the homogeneous thermoplastic state are less than 5%.

Discussion of Table II:

The criterion for evaluation as to how well or poorly the homogenization of the starch has been effected is the value F for the crystalline portions. Values of 0 are optimal while values of more than 5% already permit the conclusion that there is insufficient homogeneity of the thermoplastic starch. The values found for E, i.e. for the intrinsic viscosity, lie within a reasonable range but even the lowest value found for E gives an average molecular weight $M_G$ of 1.5 million.

If one compares the different values for A, i.e. for the composition of the starch mixtures with $P_3$ and with $P_4$, it is clear that the values pass through an optimum within a region of 0.25 to 0.3. Thus, for instance, mixtures of the starch P3 with A values of 0.35 and 0.4 after the homogenization still have high crystalline percentages while values for A of 0.3 and 0.25 show practically no crystalline portions any longer. The same picture results furthermore also for starch mixtures from potato starch P4 with additive. This statement can of course not be generalized, but the homogenization effect depends, not least of all, also on the composition or properties of the additive or additives.

One essential criterion for the homogenization is the power introduced, it being clear from the experiments that the greater the power introduced into the kneader, the better the homogenization of the starch. This can be noted for instance from samples 3a, 3b and 3c, where the homogenization takes place practically within the same temperature range and where the composition of the starch mixture is also the same, namely with a value of A=0.35. The same effect can also be noted from a comparison of Samples 9 and 10, where Sample 10 with a higher amount of power introduced into the kneader gives sufficient homogeneity while Sample 9 shows a crystallinity content of 25%.

For obtaining sufficient homogeneity in the thermoplastic starch there is also essential the selection of the temperatures in the homogenization apparatus, as can be noted, for instance, from a comparison of Samples 5a and 5b. Thus for example, Sample 5b results in better homogeneity even though although less power has been introduced into the kneader. The better homogeneity results here substantially from the definitely higher temperatures selected in the kneader.

The measured values set forth in Table II however clearly show that no prediction can be generalized as to composition, temperatures selected in the kneader and power introduced. Therefore, for each starch/additive mixture selected it is a question of optimizing the conducting of the process in order to obtain a thermoplastic starch. In the final analysis, the question is also essential as to whether one wishes to obtain a high or low molecular weight. This question depends in the final analysis on the use requirements, e.g. whether the thermoplastic starch is to be used for injection molding or extrusion. As is known, polymers of higher viscosity are more suitable for extrusion while polymers of lower viscosity are more suitable for injection molding.

Referring again to the homogenization of the starch, it should also be mentioned that, of course, the dwell time of the material in the homogenizing apparatus or kneader can affect the homogeneity of the material.

TABLE III

|   | a Modulus (GPa) | A (—) | E[cm³/g] | F (%) | G (%) | H[kJ/m2] |
|---|---|---|---|---|---|---|
| I | 1.6–2.2 | 0.25 | 60–150 | 0–5 | 40–55 | 500–650 |
| II | 1.6–2.2 | 0.25 | 150–200 | 5–50 | 2–5 | 15–50 |

Comments on Table III:

Table III shows the influence of the homogeneity or crystallinity of the thermoplastic starch on mechanical properties based on the illustrative description of the influence on elongation and fracture behavior of the starch.

Sample I concerns test pieces of thermoplastic starch material which is sufficiently or almost ideally homogenized and is suitably thermoplastically processable. Sample II is a sample of starch which is insufficiently homogenized and accordingly contains too high a percentage of crystallinity.

The modulus column sets forth the modulus of elasticity of the two materials, which interestingly enough is practically the same for both materials. Column A sets forth the composition of the samples, Column E, in the same way as in Table II, the intrinsic viscosity of the samples, and Column F the value of the crystalline percentage.

G is the relative elongation of the material upon rupture in percent and H is the amount of energy which was fed to the material until its fracture. The dimension of H is KJ/m².

In line 1 there are set forth the values of various measurements for samples I which comprise a crystalline percentage on the order of magnitude of 0 to max. 5%. There are concerned here therefore materials which are almost ideally homogenized and accordingly can be excellently thermoplastically processed.

In corresponding manner there are set forth in line II various measurements for Materials II which are insufficiently homogenized.

From Column G it can clearly be noted that the starch materials from line II are essentially more brittle than the materials in line I. Furthermore, substantially more energy must, as shown in Column H, be fed to the starch materials of line I in order to elongate them to rupture.

Based on the stress/strain tests which are numerically set forth in Table II, the improvement in the mechanical properties of thermoplastically processable starch can be clearly noted. Based on the reduction in the crystallinity of the material to less than 5%, one thus obtains starch materials having sufficient to good mechanical properties. These mechanical properties can, of course, be further improved by the amount of plasticizer and by suitable selection of addition substances.

Since shearing forces in the molten mixture of starch and additive are obviously responsible for the homogenization effect and thus lead to a material of low crystallinity, the relationship between the shear viscosity of the melt and the shearing action of the homogenizing apparatus will be discussed in more detail. For this purpose, the structure viscosity of the molten starch, i.e. the dependence of the shear viscosity on the shearing rate, is examined in a capillary rheometer.

The following equation was found as correlation between the two values:

$$\eta = K \cdot y^{(1-m)}$$

Herein, $\eta$ is the shear viscosity of the melt in Pa×sec, and y is the sheer velocity in sec$^{-1}$. K is a physical constant which is at times also referred to as the consistency. K is calculated from the following equation:

$$K = \exp\left[ E_A \left( \frac{1}{T} - \frac{1}{T_o} \right) - a(A - A_o) \right]$$

For the term $E_A/R$ a value of $5.52 \times 10^4$ Kelvin was found, R being the gas constant and $E_A$ the thermal activation energy of the change-of-place process of the molecules upon the flowing of the melt.

T is the temperature of the melt (in degrees Kelvin) and To is a reference temperature of 458 Kelvin.

a is also a constant having the value of $2.76 \times 10^2$ and A is, as is known, the composition of the starch/additive mixture. $A_o$ is the composition of a reference mixture having a value of $A = 0.1$.

In this connection it is now found that the term m is a function of the temperature of the melt and of the composition of the starch/additive (plasticizer) mixture.

Table IV lists values of m as a function of T (degrees Kelvin) and of A, these values having been obtained in the manner that the shear viscosity established itself suitably with a predetermined $\gamma$, i.e. the shear velocity in the measurement device. For m there is thus obtained a function of the general formula $m = (g(T) + f(A) + r(T, A))$.

The values of Table IV emphasize the already suspected fact that, at elevated temperature of the melt, the shear velocity can be reduced in order to obtain the same shear viscosity in the melt and, with increased proportion of plasticizer, the temperature of the melt can be reduced in order to obtain the same shear viscosity in the melt.

TABLE IV

| m | T (K)° | A |
|---|---|---|
| 0.68 | 433 | 0.203 |
| 0.74 | 441 | 0.203 |
| 0.78 | 443 | 0.203 |
| 0.68 | 455 | 0.181 |
| 0.75 | 463 | 0.181 |
| 0.78 | 466 | 0.181 |

The starch, or better, thermoplastic starch, which has now been homogenized in this manner can then be further processed directly in accordance with the customary methods of processing plastics, such as injection molding, extrusion, sheet blowing, spray blowing, deep drawing etc. In this connection, to be sure, it is necessary, particularly in the case of extrusion, tube blowing, injection blowing etc., that the additive have a vapor pressure which is definitely less than 1 bar at the temperature with which the melt leaves the nozzle at the extruder. The same applies also with respect to the water content of the melt, which must not be too high. It must therefore also be seen to it that sufficient additive is present in the melt to displace or replace the water. With too high a water content or the use of an additive having too high a vapor pressure, the material foams upon leaving the nozzle.

By further addition of addition substances as described above, the properties of the moldings and extrudates can be further substantially affected. Thus, for instance, by the addition of inorganic fillers such as magnesium oxide, magnesium carbonate, alumina, silicon dioxide etc., the transparency can be reduced or entirely prevented. Additions of vegetable or animal fats improve the flow properties of the melt or serve to improve removal from the mold. The affecting of the properties is, to be sure, not primarily an object of the present invention, so that further description hereof can be dispensed with.

Another important aspect involves adding of cross-linking agents to the starch since shaped bodies and extrudates of pure starch are not water resistant, due to its hydrophilic nature. By the addition of cross-linking agents and other chemical-modifying agents, parts made of starch become at least partially or almost completely water resistant and can thus be used without difficulty in actual practice. The selection and addition of one of the abovementioned cross-linking agents depends essentially on the additive and the amount thereof added to the native starch, in which connection the addition substances may also play a role. Temperature and dwell time in the extruder, i.e. upon the melting, homogenizing and processing, are therefore the essential criteria for the type of cross-linking agent to be selected. In principle, the cross-linking should not proceed so far during the processing of the starch that the thermoplasticity is so affected thereby that processing becomes problematical. This, however, is fully known from the processing of partially cross-linkable thermoplastics, from the production of powdered lacquers etc., so that it need not be gone into further.

The aforementioned additives and processing conditions used by way of example have served only for further explanation of the invention and can be varied in accordance with the requirements in any desired way by the use of other materials and processing conditions. It is essential in this connection that by the addition of an additive to the native starch and the mixing of these two materials in the melt, a thermoplastically processable starch can be obtained. It is furthermore essential that the additive have a cohesion energy density which makes it possible for it to affect the molecular structure of the native starch in such a manner that the thermoplastic processability thereof can be obtained. Finally, another requirement is that the vapor pressure of the additives be less than 1 bar within the processing temperature range, at least in the case of open processing.

What is claimed is:

1. A method of preparing thermoplastically processable starch which is a substantially water free, combination of starch with at least one additive, the method comprising admixing starch with at least 5 weight percent based on the weight of the mixture of at least one additive, said additive being such that it reduces the melting point of the starch in the mixture to below the decomposition temperature of the starch, said additive having a solubility parameter of more than 15 cal$^{\frac{1}{2}}$cm$^{-2/3}$, said additive having a vapor pressure of less than 1 bar in said mixture at a temperature of about the melting point of said mixture, and melting and mixing said admixture until it is substantially water free and until the crystalline content is less than 5%.

2. A method according to claim 1 wherein said additive has a solubility parameter of 15 to 25 cal$^{\frac{1}{2}}$cm$^{-3/2}$ within a temperature range of 150°–300° C. and the interfacial energy between the additive and the starch is not greater than 20% of the individual interfacial energies of the starch and additive with respect to air.

3. A method according to claim 1 wherein the portion $\delta_P$ and $\delta_H$ are at least twice as large as the dispersion portion of $\delta_d$ of the solubility parameter $\delta$ of said at least one additive.

4. A method according to claim 1 wherein the additive is about 10 to 35% based on the total weight of said admixture.

5. A method according to claim 1 wherein the mixing of the molten starch and additive is effected within a temperature range of 150° to 300° C.

6. A method according to claim 5 wherein the mixing of the molten starch and additive is effected within a temperature range of 160° to 190° C.

7. A method according to claim 1 wherein the melting and mixing is effected in a plastic processing machine and a total energy supplied to the mixture is at least 0.3–0.35 KWh/kg mass-output of the mixture.

8. A method according to claim 1 wherein the additive is selected from the group consisting of dimethyl sulfoxide, sorbitol, glycerin, ethylene glycol, propylene glycol, diglyceride, diglycol ether, formamide, dimethylformamide, methylformamide, dimethylurea, dimethylacetamide, methylacetamide, ethanol amine and propanol amine.

9. A method according to claim 1 wherein at least one member of the group consisting of blending component, lubricant, softening agent, flexibilizing agent, pigmenting agent cross-linking agent and mold removal agent is added to said mixture of starch and additive.

10. A method according to claim 1 wherein the resulting melt is formed into granulates, flakes, pills, powers, tablets, fibers, extrudates or sheets.

11. A method according to claim 1 wherein the starch admixed has an average molecular weight determined by intrinsic viscosity of more than 1 million.

12. A method according to claim 11 wherein the average molecular weight lies within the range of 3 million to 10 million.

13. A method according to claim 1 wherein said steps are effected under substantially anhydrous conditions.

14. A method according to claim 1 wherein up to 50 weight % of one or more blending components consisting of the following materials:
gelatin
a protein
a polysaccharide
a cellulose derivative
a synthetic polymer which is at least approximately soluble in the additive for the starch
a gelatin phthalate
is combined with said mixture of starch and additive.

15. A method according to claim 1 wherein the additive is of the formula:

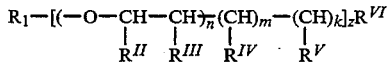

in which K, m and n individually are 0 to 5 provided n=0 if m, k≠0, z is a positive integer, R$^1$ is H, CH$_3$, or —(CH$_2$)$_4$—C and R$^{II}$ to R$^{VI}$ individually are OH or NH$_2$ provided at least one is OH, or

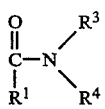

in which R$_1$ is H, —CH$_3$, —CH$_2$—CH$_3$ or NR$^3$R$^4$, and R$^3$ and R$^4$ are individually H, —CH$_3$, —CH$_2$—CH$_3$ provided in case that R$^1$ equal NR$^3$R$^4$, R$^4$ are not H or alkyl simultaneously.

16. A method according to claim 1 wherein the melting and mixing is continued until the starch has a moisture content of less than 1.0%.

17. A method according to claim 1 wherein the polar portion $\delta_P$ and the portion $\delta_H$ of the solubility parameter $\delta$ corresponding to the hydrogen bonds of said additive are each larger than the dispersion portion $\delta_d$ of the solubility parameter $\delta$.

18. A method according to claim 1 wherein the starch has a water content of about 17% before said mixing and melting.

19. A method according to claim 1 wherein glycerol in an amount of 5 to 35% is combined with said mixture.

20. A thermoplastically processable starch comprising a substantially water free, homogeneous mixture having a crystalline content of less than 5% of starch and at least 5 weight % of at least one additive having a solubility parameter of more than 15 cal$^{\frac{1}{2}}$cm$^{-3/2}$, said additive having a vapor pressure in the mixture of less than 1 bar at about the melting point of the homogeneous mixture, and the melting point of the mixture being lower than the decomposition temperature of the starch.

21. A thermoplastically processable starch according to claim 20 wherein the average molecular weight of the starch determined by intrinsic viscosity is at least 1 million.

22. A thermoplastically processable starch according to claim 20 wherein the average molecular weight of the starch determined by intrinsic viscosity is 3 to 10 million.

23. A thermoplastically processable starch according to claim 20 wherein it is present in the form of granulates, flakes, pills, tablets, power or fiber.

24. A thermoplastically processable starch according to claim 20 wherein the moisture content is less than 1.0%.

25. A thermoplastically processable starch according to claim 20 wherein the additive is at least one member selected from the group consisting of dimethyl sulphoxide, sorbitol, glycerin, ethylene glycol, propylene glycol, triglyceride, diglycol ether, formamide, methylformamide, dimethyl formamide, dimethyl acetamide, methyl acetamide, dimethyl urea, ethanol amine and propanol amine.

26. A thermoplastically processable starch according to claim 20 wherein said additive has a solubility parameter of 15 to 25 cal$^{\frac{1}{2}}$cm$^{-3/2}$ within a temperature range of 150° to 300° C.

27. A thermoplastically processable starch according to claim 20 wherein the polar portion $\delta_P$ and the portion $\delta_P$ of the solubility parameter $\delta$ corresponding to the hydrogen bonds of said additive are each larger than the dispersion portion $\delta_d$ of the solubility parameter $\delta$.

* * * * *

UNITED STATES PATENT AND TRADEMARK OFFICE
CERTIFICATE OF CORRECTION

PATENT NO. : 5,362,777
DATED : Nov. 8, 1994
INVENTOR(S) : Ivan Tomka

It is certified that error appears in the above-identified patent and that said Letters Patent are hereby corrected as shown below:

Col. 13, line 10, change "$cal^{1/2}\ cm^{-2/3}$" to --$cal^{1/2}\ cm^{-3/2}$--.

Signed and Sealed this

Eleventh Day of April, 2000

Attest:

Q. TODD DICKINSON

Attesting Officer

Director of Patents and Trademarks